US006403954B1

(12) United States Patent
Carlson

(10) Patent No.: US 6,403,954 B1
(45) Date of Patent: Jun. 11, 2002

(54) LINEAR FILTER

(75) Inventor: Arthur Carlson, Garching (DE)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/456,786

(22) Filed: Dec. 8, 1999

(51) Int. Cl.[7] ................................................ B01D 59/44

(52) U.S. Cl. ....................................................... 250/290

(58) Field of Search ................................ 250/283, 290, 250/282, 298; 204/156, 164

(56) References Cited

U.S. PATENT DOCUMENTS

| | | | | |
|---|---|---|---|---|
| 3,722,677 A | | 3/1973 | Lehnert | |
| 4,213,043 A | * | 7/1980 | Dawson | 250/283 |
| 5,350,454 A | | 9/1994 | Ohkawa | |
| 5,681,434 A | | 10/1997 | Eastlund | |
| 5,868,909 A | | 2/1999 | Eastlund | |

FOREIGN PATENT DOCUMENTS

| | | |
|---|---|---|
| WO | PCT/GB97/00676 | 9/1997 |

OTHER PUBLICATIONS

Bittencourt, J.A., and Ludwig, G.O.; Steady State Behavior of Rotating Plasmas in a Vacuum–Arc Centrifuge; *Plasma Physics and Controlled Fusion*, vol. 29, No. 5, pp. 601–620; Great Britain, 1987.

Bonnevier, Björn; Experimental Evidence of Element and Isotope Separation in a Rotating Plasma; *Plasma Physics*, vol. 13; pp. 763–774; Northern Ireland, 1971.

Kim, C.; Jensen, R.V.; and Krishnan, M; Equilibria of a Rigidly Rotating, Fully Ionized Plasma Column; *J. Appl. Phys.*, vol. 61, No. 9; pp. 4689–4690; May, 1987.

Dallaqua, R.S.; Del Bosco, E.; da Silva, R.P.; and Simpson, S.W; Langmuir Probe Measurements in a Vacuum Arc Plasma Centrifuge; *IEEE Transactions on Plasma Science*, vol. 26, No. 3, pp. 1044–1051; Jun., 1998.

Dallaqua, Renato Sérgio; Simpson, S.W. and Del Bosco, Edson; Experiments with Background Gas in a Vacuum Arc Centrifuge; *IEEE Transactions on Plasma Science*, vol. 24, No. 2; pp. 539–545; Apr., 1996.

Dallaqua, R.S.; Simpson, S.W.; and Del Bosco, E; Radial Magnetic Field in Vacuum Arc Centrifuges; *J. Phys. D.Apl. Phys.*, 30; pp. 2585–2590; UK, 1997.

Evans, P.J.; Paoloni, F. J.; Noorman, J. T. and Whichello, J. V.; Measurements of Mass Separation in a Vacuum–Arc Centrifuge; *J. Appl. phys.* 6(1); pp. 115–118; Jul. 1, 1989.

(List continued on next page.)

*Primary Examiner*—Jack Berman
*Assistant Examiner*—Johnnie L Smith, II
(74) *Attorney, Agent, or Firm*—Nydegger & Associates

(57) ABSTRACT

A linear plasma mass filter includes a container which is shaped as a rectangular prism. Magnetic coils encircle the container for generating a uniform magnetic field (B) in the container, and electrodes are mounted on the container for generating an electric field (E) in the container. Specifically, the electric field is rectilinear in that all of the electric field lines are parallel to each other. Further, the electric field is oriented perpendicular to the magnetic field to create crossed electric and magnetic fields (E×B). A plasma source is provided for injecting a multi-species plasma into the container which includes relatively low mass particles ($M_1$), and relatively high mass particles ($M_2$). Both $M_1$ and $M_2$ are responsive to the magnetic field with respective cyclotron orbits of a first diameter ($D_1$) and a second diameter ($D_2$). A first collector is positioned in the container at a projected distance $d_1$ from the plasma source for collecting the relatively light mass particles ($M_1$) and a second collector is positioned in the container at a projected distance $d_2$ from said plasma source for collecting the relatively high mass particles ($M_2$). For the present invention: $d_1<D_1<d_2<D_2$.

22 Claims, 2 Drawing Sheets

OTHER PUBLICATIONS

Geva, M.; Krishnan, M; and Hirshfield, J. L. ; Element and Isotope Separation in a Vacuum–Arc Centrifuge; *J. Appl. Phys* 56(5); pp. 1398–1413; Sep. 1, 1984.

Krishnan, M.; Centrifugal Isotope Separation in Zirconium Plasmas; *Phys. Fluids* 26(9); pp. 2676–2682; Sep., 1983.

Krishnan, Mahadevan; and Prasad, Rahul R.; Parametric Analysis of Isotope Enrichment in a Vacuum–Arc Centrifuge; J. Appl. Phys. 57(11); pp. 4973–4980; Jun., 1, 1985.

Prasad, Rahul R. and Krishnan, Mahadevan; Theoretical and Experimental Study of Rotation in a Vacuum–Arc Centrifuge; *J. Appl. Phys.*, vol. 61, No. 1; pp. 113–119; Jan. 1, 1987.

Prasad, Rahul R. and Mahadevan Krishnan; Article from *J. Appl. Phys.* 61(9); American Institute of Physics; pp. 4464–4470; May, 1987.

Qi, Niansheng and Krishnan, Mahadevan; Stable Isotope Production; p. 531.

Simpson, S.W.; Dallaqua, R.S.; and Del Bosco, E.; Acceleration Mechanism in Vacuum Arc Centrifuges; *J. Phys. D: Appl. Phys.* 29; pp. 1040–1046; UK, 1996.

Slepian, Joseph; Failure of the Ionic Centrifuge Prior to the Ionic Expander; p. 1283; Jun., 1955.

Anders, Andre; Interaction of Vacuum–Arc–Generated Macroparticles with a Liquid Surface; *American Institute of Physics*; 1998.

Yoshikawa, Masaji et al.; Plasma Confinement in a Toroidal Quadrupole; *The Physics of Fluids*; vol. 12, No. 9; Sep. 1969.

Ohkawa, Tihiro et al.; Plasma Confinement in dc Octopole; *Physical Review Letters*; vol. 24, No. 3; Jan. 19, 1970.

* cited by examiner

LINEAR FILTER

FIELD OF THE INVENTION

The present invention pertains generally to devices and apparatus for separating different materials from each other according to their respective masses. More particularly, the present invention pertains to electromagnetic devices which employ crossed magnetic and electric fields wherein all of the electric field lines are substantially parallel to each other. The present invention is particularly, but not exclusively, useful as a device for separating charged particles in a multi-species plasma from each other according to their respective cyclotron orbits.

BACKGROUND OF THE INVENTION

There are many reasons why it may be desirable to separate or segregate mixed materials from each other. Indeed, many different types of devices, which rely on different physical phenomena, have been proposed for this purpose. For example, settling tanks which rely on gravitational forces to remove suspended particles from a solution and thereby segregate the particles are well known and are commonly used in many applications. As another example, centrifuges which rely on centrifugal forces to separate substances of different densities are also well known and widely used. In addition to these more commonly known methods and devices for separating materials from each other, there are also devices which are specifically designed to handle special materials. A plasma centrifuge is an example of such a device.

As is well known, a plasma centrifuge is a device which generates centrifugal forces that separate charged particles in a plasma from each other. For its operation, a plasma centrifuge necessarily establishes a rotational motion for the plasma about a central axis. A plasma centrifuge also relies on the fact that charged particles (ions) in the plasma will collide with each other during this rotation. The result of these collisions is that the relatively high mass ions in the plasma will tend to collect at the periphery of the centrifuge. On the other hand, these collisions will generally exclude the lower mass ions from the peripheral area of the centrifuge. The consequent separation of high mass ions from the relatively lower mass ions during the operation of a plasma centrifuge, however, may not be as complete as is operationally desired, or required.

Apart from a centrifuge operation, it is well known that the orbital motions of charged particles (ions) which have the same velocity in a magnetic field, or in crossed electric and magnetic fields, will differ from each other according to their respective masses. Thus, when the probability of ion collision is significantly reduced, the possibility for improved separation of the particles due to their orbital mechanics is increased. For example, U.S. application Ser. No. 09/192,945 which was filed on Nov. 16, 1998, by Ohkawa for an invention entitled "Plasma Mass Filter" and which is assigned to the same assignee as the present invention discloses a device which relies on the different orbital motions of charged particles in a low density environment to separate the charged particles from each other. As implied above, In order to do this the plasma must be generated under low density conditions where the collisionality of the plasma is low. For purposes of the present invention, the collisionality of the plasma is considered to be low when the ratio of ion cyclotron frequency to ion collisional frequency is approximately equal to one, or is greater than one.

As indicated above, plasma centrifuges require a rotational motion of the plasma in order to generate centrifugal forces that are required for separating particles in the plasma from each other. To generate such a motion, centrifuges have typically used an axisymetric radially oriented electric field. However, when ion orbital mechanics, rather than centrifugal forces and particle collisions, are relied on to differentiate particles of different mass, the actual orientation of the electric field need not be so specifically oriented. Consequently, as more thoroughly indicated in the mathematics set forth below, when the collisionality of a plasma is low, charged particles in the plasma, which have different masses, can be distinguished by their cyclotron frequency responses to the magnetic field (e.g. the size of their respective orbits). Importantly, this can be done irrespective of the orientation of the electric field.

The equation of motion of an ion in static electric and magnetic fields is $$\frac{m}{q}\ddot{\vec{r}} = \vec{E}(\vec{r}) + \dot{\vec{r}} \times \vec{B}$$

With a linearly varying electric field $$\vec{E}(x) = E'x\vec{e}_x$$

(Note that we are measuring the x-coordinate from the line where the electric field vanishes.) and constant magnetic field $$\vec{B} = B\vec{e}_z$$

the components of the equation of motion (ignoring the trivial z-component) become $$\begin{cases} \frac{m}{q}\ddot{x} = E'x + \dot{y}B \\ \frac{m}{q}\ddot{y} = -\dot{x}B \end{cases}$$

$$\begin{cases} \dddot{x} = \dot{x}\frac{qE'}{m} + \ddot{y}\left(\frac{qB}{m}\right) \\ \ddot{y} = -\dot{x}\left(\frac{qB}{m}\right) \end{cases}$$

$$\dddot{x} = \dot{x}\left(\frac{qE'}{m} - \Omega_c^2\right) = -\Omega^2\dot{x}$$

where we have defined $$\Omega_c = \frac{qB}{m} \quad \text{and} \quad \Omega^2 = -\left(\frac{qE'}{m} - \Omega_c^2\right)$$

For an ion mass (actually m/q) smaller than a cutoff value $$m_c = \frac{qB^2}{E'}$$

$\Omega$ is real and the orbits are oscillatory. For masses greater than the cutoff they are unbounded. It will be convenient to introduce $$\delta = \frac{(m_c - m)}{m_c} = 1 - \frac{mE'}{qB^2} = \frac{\Omega^2}{\Omega_c^2}$$

the fractional mass difference to the cutoff mass.

The complete orbit of an ion with initial position $(x_0,y_0)$ and velocity $(v_{x0},v_{y0})$ is:

$$x(t)=x_0+X(e^{i\Omega t}-1) \quad y(t)=y_0-\delta^{-1/2}(1-\delta)(x_0-X)(\Omega t)+i\delta^{-1/2}X(e^{i\Omega t}-1)$$

with $$X=-\delta^{-1/2}(v_{y0}/\Omega)-\delta^{-1}(1-\delta)x_0-i(v_{x0}/\Omega)$$

For bounded orbits, the excursion in the x-direction is $2|X|$, and the period in the y-direction is $2\pi\Re(\delta^{-1/2}(1-\delta)(x_0-X))$. We write out $$\dot{y}=-\delta^{-1/2}(1-\delta)(x_0-X)\Omega-\delta^{-1/2}X\Omega e^{i\Omega t}$$

for reference

For the special case of an ion initially at rest, $$X=-\delta^{-1}(1-\delta)x_0$$

The excursion in the x-direction is twice the magnitude of this, and the period in the y-direction is $2\pi\delta^{-3/2}(1-\delta)x_0$. Except for the divergence near the cutoff, the fundamental scale of the orbit for any mass is $(1-\delta)x_0=mE_0/qB^2$, where $E_0=E'x_0$ is the electric field at the initial position.

In light of the above, it is an object of the present invention to provide a linear plasma mass filter which has a substantially rectilinear configuration for its electric field. It is another object of the present invention to provide a linear plasma mass filter which more precisely differentiates between charged particles of different mass (i.e. where the relative mass difference is small). Still another object of the present invention is to provide a linear plasma mass filter which will differentiate between the masses of the charged particles in the plasma. Yet another object of the present invention is to provide for a linear plasma mass filter which is simple effective to use, relatively easy to manufacture, and comparatively cost.

SUMMARY OF THE PREFERRED EMBODIMENTS

In accordance with the present invention, a linear plasma mass filter includes a container which defines a chamber. For one embodiment of the present invention, the container is shaped substantially like a right rectangular prism. In detail, the container has a first wall which is opposed to, and which is substantially parallel to a second wall. Both the first and second walls are substantially perpendicular to a third wall, and this third wall is opposed to and substantially parallel to a fourth wall. Both the third and fourth walls are, in turn, substantially perpendicular to a fifth wall which is opposed to and substantially parallel to a sixth wall. Stated differently, the container is shaped like a box. In another embodiment, the container may be more cylindrical shaped.

For the above described generally box-like configuration for the container, magnets are mounted on the third and fourth walls of the container for generating a substantially uniform magnetic field (B) in the chamber. Alternatively, current-carrying coils can be wrapped around the third, fourth, fifth and sixth wall of the container to produce a substantially uniform magnetic field (B) in the chamber. In either case, the magnetic field (B) is oriented in the container with its magnetic field lines substantially perpendicular to the first and second walls. Additionally, electrodes are mounted on the first and second walls for generating a rectilinear electric field (E). Specifically, the rectilinear electric field (E) is oriented with its electric field lines substantially perpendicular to the third and fourth walls and generally parallel to the fifth and sixth walls. For this particular configuration, the fifth and sixth walls will be preferably made of a dielectric non-conducting material. Thus, crossed electric and magnetic fields (E×B) are created in the chamber which act substantially perpendicular to both the fifth and sixth walls of the container. For the cylindrical configuration of the chamber, of course, there will be no separately definable walls. Nevertheless, the functionality of the present invention is not changed so long as there is a electric field (E) in the chamber which is oriented substantially perpendicular to a magnetic field (B) in order that there be crossed electric and magnetic fields (E×B).

A plasma source provides a multi-species plasma in the chamber, where it is to be processed. As intended for the present invention, the multi-species plasma will include charged particles which have different masses. If, however, the plasma contains some particles that are not single ionized, it is to be understood that the term "mass" actually refers to the "mass-to-charge ratio." Accordingly, the multi-species plasma can contain relatively low mass particles $(M_1)$ and relatively high mass particles $(M_2)$, or even super high mass particles $(M_3)$. Importantly, the relatively low mass particles $(M_1)$ are responsive to the magnetic field in the chamber by having cyclotron orbits of a first diameter $(D_1)$. On the other hand, the relatively higher mass particles $(M_2)$ are responsive to the magnetic field by having cyclotron orbits of a second diameter $(D_2)$, while super high mass particles $(M_3)$ will have cyclotron orbits with a third diameter (D3) which may be infinitely large or unbounded. In this case, due to their different masses, $D_1$ is less than $D_2$, which is less than $D_3$ $(D_1<D_2<D_3)$.

In order to collect the particles from the multi-species plasma, while they are separated from each other in the chamber, a preferred embodiment for the linear mass filter of the present invention includes a first collector and a second collector. Specifically, the first collector is positioned in the chamber at a height distance above the plasma source, $d_1$. Importantly, the distance $d_1$ is less than the first cyclotron orbit diameter $D_1$ of the lower mass particles $M_1$ (i.e. $d_1<D_1$). There is also a second collector which is positioned in the chamber at a height distance, $d_2$, above the plasma source. Also importantly, $d_2$ is greater than $D_1$, but less than the second cyclotron orbit diameter $D_2$ (thus: $d_1<D_1<d_2<D_2$). A similar situation results when $M_3$ is also considered.

Because the crossed electric and magnetic fields in the chamber (E×B) will impart a movement to all of the charged particles ($M_1$, $M_2$ and $M_3$), regardless of their mass, the collectors can be selectively positioned in the chamber to intercept charged particles of a particular mass. Specifically, the particle movement imparted by E×B will be in the direction of E×B, which is perpendicular to both the electric field (E) and the magnetic field (B). Accordingly, by positioning the collectors which are intended to intercept the lower mass ions downstream in the direction of E×B (i.e. the first collector), the second collector can be positioned to intercept the high mass ions as they enter the chamber from the plasma source, without interference from the first collector. The lower mass particles, $M_1$, will, of course, never reach the second collector due to their relatively smaller cyclotron orbit diameters, $D_1$, and will continue to move under the influence of E×B until they are intercepted by the first collector. Thus, with this configuration, the first collector can be used for collecting the relatively light mass particles $(M_1)$, while the second collector is used for collecting the relatively higher mass particles $(M_2)$. When this is done, care must be taken to avoid charge build-up that can modify the applied potential.

For one embodiment of the linear plasma mass filter of the present invention, both the first collector and the second collector are plate-like structures which have substantially flat surfaces. For this embodiment, the surfaces of the collectors are parallel to each other and are oriented so that they are substantially perpendicular to the electric field E. The surfaces are also oriented so that they will be substantially parallel to both the magnetic field B and to the crossed electric and magnetic fields E×B. Recall, the first collector is positioned downstream from the second collector in the direction of E×B. In another embodiment, the first and second collectors are substantially perpendicular to each other. For this embodiment, a surface of the first collector is oriented substantially parallel to both the electric field E and to the magnetic field B. Also, it is substantially perpendicular to the crossed electric and magnetic fields E×B. On the other hand, the surface of the second collector is substantially perpendicular to the electric field E and is substantially parallel to the magnetic field B and to the crossed electric and magnetic fields E×B. For either embodiment, the electric field (E) can be either substantially constant or spatially variable.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1A:
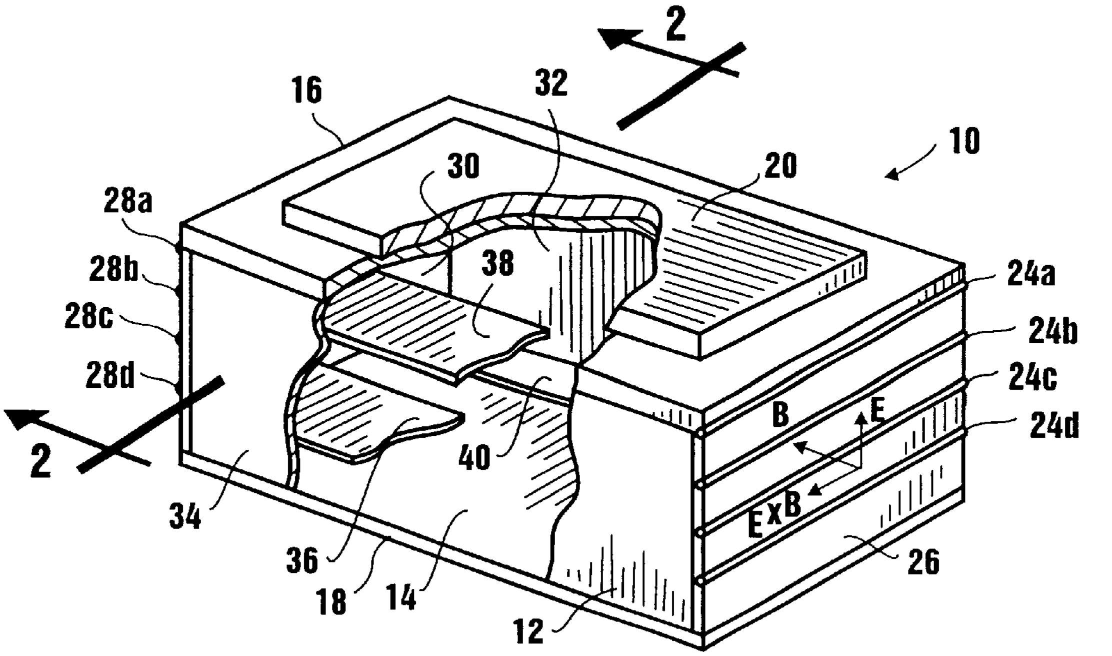
FIG. 1A is a perspective view of the linear plasma mass filter in accordance with the present invention.
Figure 1B:
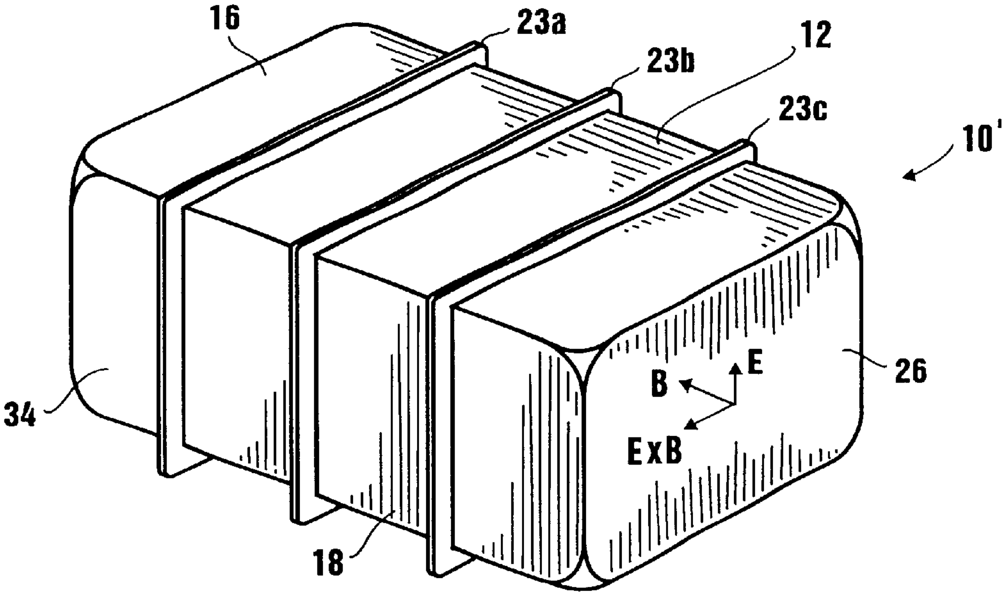
FIG. 1B is a perspective view of an alternate embodiment of the linear plasma mass filter in accordance with the present invention.

Referring initially to FIG. 1A, a plasma filter in accordance with the present invention is shown and is generally designated 10. For the particular embodiment of the present invention shown in FIG. 1A, the filter 10 includes a generally rectangular prism-shaped container 12 which defines and establishes a chamber 14 inside the container 12. Specifically the container 12 has a top wall 16 and a bottom wall 18. As shown, the top wall 16 is opposed to and is generally parallel with the bottom wall 18. A magnet 20 is mounted on the top wall 16 and a magnet 22 (see FIG. 2) is mounted on the bottom wall 18 to generate a magnetic field (B) in the chamber 14. Alternatively, as shown in FIG. 1B, a plurality of magnetic current-carrying coils 23 (the coils 23*a*, 23*b* and 23*c* are only exemplary) can be used for generating the magnetic field (B). If coils 23 are incorporated, they will be mounted substantially as shown, with the plane of the coils 23 being perpendicular to the walls 16 and 18. Thus, as intended for the present invention, and regardless whether magnets 20 and 22 are used, or coils 23*a–c* are used, the magnetic field (B) is substantially uniform in the chamber 14 and is oriented with its flux lines generally parallel to the walls 16 and 18.

FIG. 1A also shows that a plurality of electrodes 24 (of which the electrodes 24*a–d* are only exemplary) are mounted on the end wall 26 of the container 12. Similarly, a plurality of electrodes 28 (of which the electrodes 28*a–d* are only exemplary) are mounted on the opposite end wall 30. As intended for the present invention the electrodes 24 and 28 act together to generate an electric field (E) wherein all of the electric field lines are substantially perpendicular to both the top wall 16 and the bottom wall 18. This electric field, sometimes herein referred to a rectilinear electric field (E), generally increases moving from bottom wall 18 to top wall 16. The equations derived previously assumed a linearly increasing electric field, but other functional changes can also be effective.

With the particular orientations for the magnetic field (B) and the electric field (E) disclosed above, it will be apparent to the skilled artisan that crossed electric and magnetic fields (E×B) are established in the chamber 14. Specifically, the crossed electric and magnetic fields (E×B) will be oriented substantially as shown and will directed from the side wall 32 toward the side wall 34. For the present invention, the magnetic field (B), the electric field (E) and the crossed electric and magnetic fields (E×B) are mutually perpendicular (i.e. orthogonal).

Figure 2:
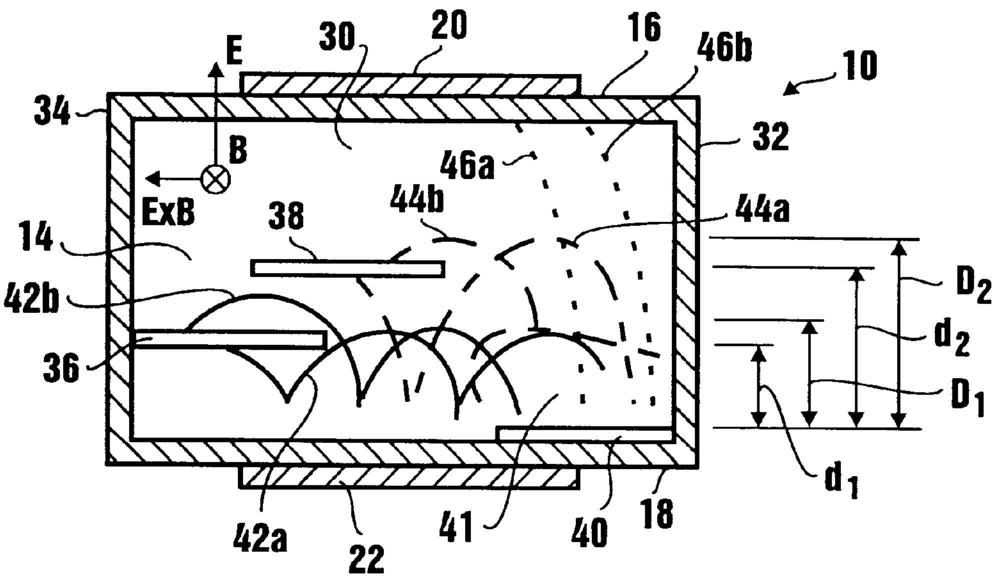
FIG. 2 is a cross sectional view of the linear plasma mass filter of the present invention as seen along the line 2—2 in FIG. 1.
Figure 3:
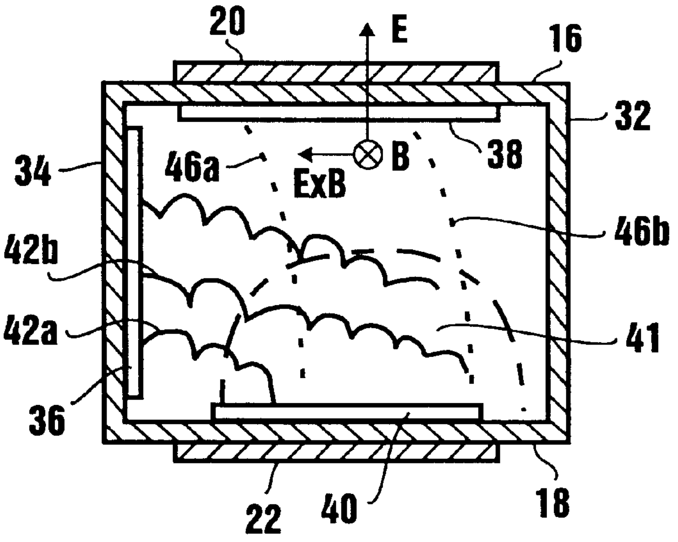
FIG. 3 is a cross sectional view of an alternate embodiment of the linear plasma mass filter as would be seen along the line 2—2 in FIG. 1.

It is also seen in the figures that the filter 10 can include a first collector 36 and a second collector 38. As shown in FIG. 1A and FIG. 2, both of the collectors 36 and 38 are oriented to be substantially parallel to each other and also parallel to the magnetic field (B) and the crossed electric and magnetic fields (E×B). In this configuration, both of the collectors 36 and 38 are perpendicular to the electric field (E) and, thus, they will tend to minimize any interference with the electrodes 24 and 28 as they generate the electric field (E). For an alternate embodiment of the filter 10 in accordance with the present invention, the collectors 36 and 38 can be oriented perpendicular to each other, as substantially shown in FIG. 3. FIGS. 1A, 2 and 3 all show that the filter 10 includes a plasma source 40 which is positioned in the chamber 14. For the present invention, it is intended that the plasma source 40 generate a multi-species plasma having charged particles (ions) of different mass. For purposes of further discussion it will be considered that the plasma source 40 will generate charged particles having a low mass ($M_1$), and charged particles having a relatively higher mass ($M_2$), as well as charged particles having a super high mass ($M_3$).

Referring for the moment to FIG. 2, it will be recalled that charged particles moving perpendicular to a magnetic field (B) will move in a circular path. With a fixed velocity, the diameter of this circular path will be directly proportional to the mass of the particle. Further, when there is an electric field (E) that is crossed with the magnetic field (B) the crossed electric and magnetic fields (E×B) will impart a motion to the particle in the direction of E×B. For this situation, as depicted in FIG. 2, a particle of low mass ($M_1$) will follow paths 42 (the paths 42*a* and 42*b* are exemplary) which are characterized by a cyclotron orbit diameter $D_1$. Similarly, a particle of relatively higher mass ($M_2$) will follow paths 44 (the paths 44*a* and 44*b* are exemplary) which are characterized by a cyclotron orbit diameter $D_2$. Further, a particle of super high mass ($M_3$) will follow paths 46 characterized by a proportional cyclotron orbit diameter ($D_3$). In their relation to each other, $D_1$ is less than $D_2$ and $D_2$ is less than $D_3$ ($D_1<D_2<D_3$).

It is an important aspect of the filter 10 that the first collector 36 and the second collector 38 be properly positioned inside the chamber 14. Specifically, as shown in both FIG. 1A and FIG. 2, for the embodiment shown, the first collector 36 is positioned at a height distance, $d_1$, from the plasma source 40. Importantly, the distance $d_1$ is less than the cyclotron orbit diameter $D_1$ for the low mass particles ($M_1$). The second collector 38, on the other hand, is positioned at a height distance, $d_2$, from the plasma source 40. As shown, $d_1<D_1<d_2<D_2$. Further, it will be noted from reference to FIG. 2 that the first collector 36 is farther downstream in the direction of E×B than is the second collector 38.

In the operation of the present invention, a plasma source 40 provides a multi-species plasma in the chamber 14. More specifically, the multi-species plasma can be either injected into the chamber 14 by the plasma source 40, or it can actually be created in a specified region 41 inside the chamber 14 (e.g. see the region 41 indicated by a dot-dash line in FIG. 2 and FIG. 3 where ionization can occur in the chamber 14 above the plasma source 40). As indicated above, the resultant plasma will include particles of different mass, e.g. $M_1$, $M_2$ and $M_3$ which have respectively increasing cyclotron orbit diameters $D_1$, $D_2$ and $D_3$. In accordance with the present invention, the charged particles will leave the plasma source 40 and will begin to drift in the direction of E×B. Also, the particles will begin their respective cyclotron orbits. The consequence of this combined motion is shown as the paths 42, 44 and 46 in FIG. 2. In any case, because the cyclotron orbits (i.e. $D_1$) of the low mass particles ($M_1$) is less than the projected distance $d_2$ from the plasma source 40 to the second collector 38, the particles of low mass ($M_1$) will move through the chamber 14 under the influence of E×B until they intercept the first collector 36. Similarly, because the cyclotron orbits(i.e. $D_2$) of the higher mass particles $M_2$ is less than the distance between the plasma source 40 and the top wall 16, the particles of higher mass ($M_2$) will move through the chamber 14 until they intercept the second collector 38. Note, the particles of higher mass ($M_2$) will arrive at the second collector 38 before even reaching the first collector 36. On the other hand, the particles of super high mass ($M_3$) will impact with the top wall 16 before reaching either the second collector 38 or the first collector 36.

For the operation of the alternate embodiment of the filter 10 shown in FIG. 3, particles of mass above (e.g. $M_2$) and below (e.g. $M_1$) a predetermined mass can be separated. In this case, particles of mass ($M_2$ and $M_3$) would be ejected into the second collector 38 located on the top wall 16. The particles of low mass ($M_1$), however, would move through the chamber 14 under the influence of E×B until they impact on the first collector 36 located on the side wall 34.

While the particular Linear Filter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A linear plasma mass filter which comprises:

a container defining a chamber;

a means for generating a substantially uniform magnetic field (B) in said chamber;

a means for generating an electric field (E) oriented with electric field lines substantially perpendicular to said magnetic field (B) to establish in said chamber crossed electric and magnetic fields (E×B) acting substantially perpendicular to said electric field (E) and said magnetic field (B);

a plasma source for providing a multi-species plasma in said chamber, said multi-species plasma including relatively low mass particles ($M_1$) responsive to said magnetic field with cyclotron orbits of a first diameter ($D_1$), and relatively high mass particles ($M_2$) responsive to said magnetic field with cyclotron orbits of a second diameter ($D_2$) wherein $D_1$ is less than $D_2$ ($D_1<D_2$);

a means for collecting said relatively low mass ions ($M_1$) positioned in said chamber at a height distance d from said plasma source for collecting said relatively low mass particles ($M_1$), with said distance $d_1$ being less than said first diameter ($d_1<D_1$); and a means for collecting said relatively high mass ions ($M_2$) positioned in said chamber at a height distance $d_2$ from said plasma source for collecting said relatively high mass particles ($M_2$), with said distance $d_2$ being greater than said first diameter and less than said second diameter ($D_1<d_2<D_2$).

2. A linear plasma mass filter as recited in claim 1 wherein said low mass collecting means is a first collector, and wherein said high mass collecting means is a second collector.

3. A linear plasma mass filter as recited in claim 2 wherein said first collector and said second collector are plate-like structures having flat surfaces and said surfaces are oriented substantially perpendicular to E and substantially parallel to B and to E×B.

4. A linear plasma mass filter as recited in claim 2 wherein said first collector and said second collector are non-conducting plate-like structures having flat surfaces and said surface of said first collector is oriented substantially parallel to E and to B and substantially perpendicular to E×B, and wherein said surface of said second collector is substantially perpendicular to E and substantially parallel to B and to E×B.

5. A linear plasma mass filter as recited in claim 1 wherein said magnetic means includes a plurality of magnetic coils.

6. A linear plasma mass filter as recited in claim 1 wherein said electric means includes a first electrode mounted on said third wall and a second electrode mounted on said fourth wall.

7. A linear plasma mass filter as recited in claim 1 wherein said electric field (E) is substantially constant.

8. A linear plasma mass filter as recited in claim 1 wherein said electric field (E) spatial distribution is variable.

9. A linear plasma mass filter as recited in claim 1 wherein said multi-species plasma includes charged particles of super high mass ($M_3$) and said filter further comprises a means for collecting said charged particles of super high mass ($M_3$).

10. A linear plasma mass filter which comprises:

a magnetic means for generating a substantially uniform magnetic field (B) in a volume;

an electrical means for generating an electric field (E) in said volume, said electric field being characterized by substantially parallel electric field lines oriented relative to said magnetic field to establish crossed electric and magnetic fields (E×B) wherein E×B at any point in said volume is directed substantially parallel to E×B at all other points in said volume;

a plasma source for providing a multi-species plasma in said volume, said multi-species plasma including relatively low mass particles ($M_1$) responsive to said magnetic field with cyclotron orbits of a first diameter ($D_1$), and relatively high mass particles ($M_2$) responsive to said magnetic field with cyclotron orbits of a second diameter ($D_2$), wherein $D_1$ is less than $D_2$ ($D_1<D_2$);

a first collector positioned in said volume at a projected distance $d_1$ from said plasma source for collecting said relatively low mass particles ($M_1$), with said distance $d_1$ being less than said first diameter ($d_1<D_1$); and a second collector positioned in said volume at a projected distance $d_2$ from said plasma source for collecting said relatively high mass particles ($M_2$), with said distance $d_2$ being greater than said first diameter and less than said second diameter ($D_1<d_2<D_2$).

11. A linear plasma mass filter as recited in claim 10 wherein said collector is a second collector and said filter further comprises a first collector positioned in said chamber at a projected distance $d_1$ from said plasma source for collecting said relatively light mass particles ($M_1$), with said distance $d_1$ being less than said first diameter ($d_1<D_1$).

12. A linear plasma mass filter as recited in claim 10 wherein said first collector and said second collector are plate-like structures having flat surfaces and said surfaces are oriented substantially perpendicular to E and substantially parallel to B and to E×B.

13. A linear plasma mass filter as recited in claim 10 wherein said collector is a second collector and said filter further comprises a first collector, wherein said first collector and said second collector are plate-like structures having flat surfaces and said surface of said first collector is oriented substantially parallel to E and to B and substantially perpendicular to E×B, and wherein said surface of said second collector is substantially perpendicular to E and substantially parallel to B and to E×B.

14. A linear plasma mass filter as recited in claim 10 further comprising a container surrounding said volume a chamber, said container being shaped substantially as a rectangular prism and having opposed first and second walls, opposed third and fourth wall, and opposed fifth and sixth walls wherein said first wall is substantially parallel to said second wall and substantially perpendicular to said third wall, wherein said third wall is substantially parallel to said fourth wall and substantially perpendicular to said fifth wall, and wherein said fifth wall is substantially parallel to said sixth wall.

15. A method for using a linear plasma mass filter which comprises the steps of:

generating a substantially uniform magnetic field (B) in a volume;

generating an electric field (E) in said volume, said electric field being characterized by substantially parallel electric field lines oriented relative to said magnetic field to establish crossed electric and magnetic fields (E×B) wherein E×B at any point in said volume is directed substantially parallel to E×B at all other points in said volume;

providing a multi-species plasma in said volume, said multi-species plasma including relatively low mass particles ($M_1$) responsive to said magnetic field with cyclotron orbits of a first diameter ($D_1$), and relatively high mass particles ($M_2$) responsive to said magnetic field with cyclotron orbits of a second diameter ($D_2$), wherein $D_1$ is less than $D_2$ ($D_1<D_2$); and positioning collectors to collect said relatively light mass particles ($M_1$) in said volume at a height distance $d_1$ from a plasma source for collecting said relatively low mass particles ($M_1$), with said distance $d_1$ being less than said first diameter ($d_1<D_1$) and said relatively high mass particles ($M_2$) in said volume at a height distance $d_2$ from said plasma source for collecting said relatively high mass particles ($M_2$), with said distance $d_2$ being greater than said first diameter and less than said second diameter ($D_1<d_2<D_2$).

16. A method as recited in claim 15 wherein said positioning step is accomplished using a first collector and a second collector.

17. A method as recited in claim 16 wherein said first collector and said second collector are plate-like structures having flat surfaces and said surfaces are oriented substantially perpendicular to E and substantially parallel to B and to E×B.

18. A method as recited in claim 16 wherein said first collector and said second collector are plate-like structures having flat surfaces and said surface of said first collector is oriented substantially parallel to E and to B and substantially perpendicular to E×B, and wherein said surface of said second collector is substantially perpendicular to E and substantially parallel to B and to E×B.

19. A method as recited in claim 16 further comprising the step of surrounding said volume with a container, said container being shaped substantially as a rectangular prism and having opposed first and second walls, opposed third and fourth wall, and opposed fifth and sixth walls wherein said first wall is substantially parallel to said second wall and substantially perpendicular to said third wall, wherein said third wall is substantially parallel to said fourth wall and substantially perpendicular to said fifth wall, and wherein said fifth wall is substantially parallel to said sixth wall.

20. A method as recited in claim 19 wherein said magnetic field is generated by using a plurality of magnet coils mounted to surround said first, second, fifth and sixth walls, and wherein said electric field is generated using a first electrode mounted on said third wall and a second electrode mounted on said fourth wall.

21. A linear plasma mass filter as recited in claim 1 wherein said electric field (E) increases linearly with distance from said source.

22. A linear plasma mass filter as recited in claim 1 wherein said second diameter ($D_2$) is unbounded.

* * * * *

UNITED STATES PATENT AND TRADEMARK OFFICE

CERTIFICATE OF CORRECTION

PATENT NO. : 6,403,954 B1 — Page 1 of 1
DATED : June 11, 2002
INVENTOR(S) : Arthur Carlson It is certified that error appears in the above-identified patent and that said Letters Patent is hereby corrected as shown below:

<u>Column 3,</u>
Line 21, delete "$2\pi\delta^{-}_{3/2}$" insert -- $2\pi\delta^{-3/2}$ --

<u>Column 8,</u>
Line 13, delete "d" insert -- $d_1$ --

Signed and Sealed this

Tenth Day of September, 2002

*Attest:*

JAMES E. ROGAN

*Attesting Officer* — *Director of the United States Patent and Trademark Office*